United States Patent [19]

Gilbert

[11] Patent Number: 5,113,900
[45] Date of Patent: May 19, 1992

[54] CHECK VALVE WITH QUICK LOCK ATTACHMENT FEATURE

[75] Inventor: Major H. Gilbert, Gladys, Va.
[73] Assignee: Bridge Products, Inc., Northbrook, Ill.
[21] Appl. No.: 648,549
[22] Filed: Jan. 30, 1991
[51] Int. Cl.⁵ .............................................. F16K 15/06
[52] U.S. Cl. .............................. 137/515.5; 137/542; 285/315; 285/319; 285/921
[58] Field of Search ............... 137/515.5, 542; 285/86, 285/315, 319, 921

[56] References Cited

U.S. PATENT DOCUMENTS

| | | |
|---|---|---|
| 967,514 | 8/1910 | Groh .............................. 137/515.5 |
| 2,289,946 | 9/1940 | Weatherhead, Jr. . |
| 2,433,119 | 12/1947 | Hansen . |
| 2,548,528 | 4/1951 | Hansen . |
| 2,594,641 | 4/1952 | Griffith et al. . |
| 2,653,792 | 9/1953 | Sacchini . |
| 2,673,062 | 3/1954 | Cornelius . |
| 2,784,987 | 3/1957 | Corcoran ........................ 285/319 X |
| 2,830,641 | 4/1958 | Wolfe . |
| 2,839,120 | 6/1958 | McCord . |
| 2,844,183 | 7/1958 | McCord . |
| 2,845,945 | 8/1958 | Mancusi, Jr. . |
| 2,845,980 | 8/1958 | Williams . |
| 2,874,749 | 2/1959 | Brink . |
| 2,904,065 | 9/1959 | Butlin . |
| 2,905,485 | 9/1959 | Zajac . |
| 2,943,639 | 7/1960 | Smith . |
| 3,010,478 | 11/1961 | Buck et al. . |
| 3,051,196 | 8/1962 | Miller . |
| 3,336,942 | 8/1967 | Keith et al. . |
| 3,430,647 | 3/1969 | Suchowolec . |
| 3,503,418 | 3/1970 | Petrucci et al. . |
| 3,633,614 | 1/1972 | Scholz . |
| 3,649,055 | 3/1972 | Nilsen . |
| 3,662,761 | 5/1972 | Hoffman . |
| 3,806,031 | 4/1974 | Olson . |
| 3,815,624 | 6/1974 | Mullins . |
| 3,891,247 | 6/1975 | Smith . |
| 3,893,476 | 7/1975 | Stroh . |
| 4,046,163 | 9/1977 | Novak . |
| 4,049,037 | 9/1977 | Gale et al. . |
| 4,062,517 | 12/1977 | Jones . |
| 4,064,923 | 12/1977 | German et al. . |
| 4,182,370 | 1/1980 | Karcher . |
| 4,475,578 | 10/1984 | Nidle . |
| 4,537,384 | 8/1985 | Petersen et al. . |
| 4,538,658 | 9/1985 | Earley . |
| 4,552,183 | 11/1985 | Chick . |
| 4,606,558 | 8/1986 | Davidson . |
| 4,624,487 | 11/1986 | Thalmann . |
| 4,647,073 | 3/1987 | Kosaka . |
| 4,739,813 | 4/1988 | Pagani . |
| 4,819,685 | 4/1989 | Pagani . |
| 4,825,893 | 5/1989 | Gailey . |
| 4,833,951 | 5/1989 | Karcher et al. . |
| 4,836,235 | 6/1989 | Pagani . |
| 4,979,721 | 12/1990 | Gilbert . |
| 4,991,627 | 2/1991 | Nix .................................. 285/319 X |

FOREIGN PATENT DOCUMENTS

| | | |
|---|---|---|
| 608673 | 11/1960 | Canada . |
| 635238 | 1/1962 | Canada . |
| 1020885 | 6/1960 | Fed. Rep. of Germany . |
| 1117950 | 5/1956 | France . |
| 607340 | 1/1948 | United Kingdom . |

OTHER PUBLICATIONS

Sketch entitled "FIG. II PLASTIC HOUSING" (undated).
Piedmont Manufacturing Co. Part No. 446 and 802; Oct. 1988.
Drawing dated May, 10, 1988 entitled "1st MOD Primary Seal".
Aeroquip 5400-S2, p. 213, undated.

*Primary Examiner*—Robert G. Nilson
*Attorney, Agent, or Firm*—Willian, Brinks, Olds, Hofer, Gilson & Lione

[57] ABSTRACT

A check valve includes first and second valve body parts. The first valve body part defines a protruding neck and the second valve body part defines a receiving flange sized to received the protruding neck in a telescoping manner. A snap fit retaining mechanism includes a set of hooks on the second valve body part and a hook receiving groove on the first valve body part. The hooks are shaped to engage the groove to hold the first and second valve body parts together as an assembly, with the neck received in the flange. A central passageway extends through the first and second valve body parts, and a valve seat is defined around the central passageway. A valve pin is mounted in the central passageway to releasably seal against the valve seat.

22 Claims, 2 Drawing Sheets

CHECK VALVE WITH QUICK LOCK ATTACHMENT FEATURE

BACKGROUND OF THE INVENTION

This invention relates to check valves such as check valves used for air conditioner system charging valves, and in particular to an improved check valve having a quick lock attachment feature that reduces or eliminates the need for threaded connections in the valve itself.

U.S. Pat. No. 4,979,721, assigned to the assignee of the present invention, discloses one prior art check valve which has been used successfully in air conditioning charging systems. This valve has been fabricated from metals such as aluminum and brass, and includes a two part assembly made up of a lower portion that defines a braze port and an upper portion in which a reciprocating valve pin is mounted. The upper and lower portions are held together by a threaded connection. In use, the lower portion is installed in an air conditioner line, preferably by brazing it in place. The upper portion is then threaded in place to the lower portion to complete the assembly.

Though this valve has met with considerable commercial success, there is a continuing need for check valves which are lighter in weight and lower in cost. Furthermore, under certain operating conditions the threads used in this valve to hold the upper and lower portions of the housing together may gall, or the threads of the lower portion may otherwise be damaged. When this happens, the lower portion must be replaced, and this requires brazing steps which are undesirable in many settings.

Accordingly, it is an object of this invention to provide an improved check valve which is quick to assemble, low in cost, light in weight, and which avoids the use of threads in the lower portion of the housing and the problems associated therewith.

SUMMARY OF THE INVENTION

According to this invention, a check valve is provided which comprises first and second valve body parts. A protruding neck is formed on the first valve body part and a receiving flange is formed on the second valve body part. This receiving flange is sized to receive the protruding neck in a telescoping manner. A snap fit retaining mechanism comprises at least one hook element on one of the first and second valve body parts and at least one hook receiving element on the other of the first and second valve body parts. The hook element is shaped to engage the hook receiving element to hold the first and second valve body parts together as a valve body assembly, with the neck received in the flange. A central passageway extends through the first and second valve body parts, and a valve seat is defined around the central passageway. A valve pin is mounted in the central passageway to releasably seal against the valve seat.

Preferably, a slide is mounted around the flange for reciprocating movement between a first position, in which the slide is spaced from the hook and hook receiving elements to allow the hook element to engage the hook receiving element, and a second position in which the slide locks the hook element in engagement with the hook receiving element.

This invention is also directed to the first and second valve body parts described above as separate components.

DETAILED DESCRIPTION OF THE PRESENTLY PREFERRED EMBODIMENTS

Figure 1:
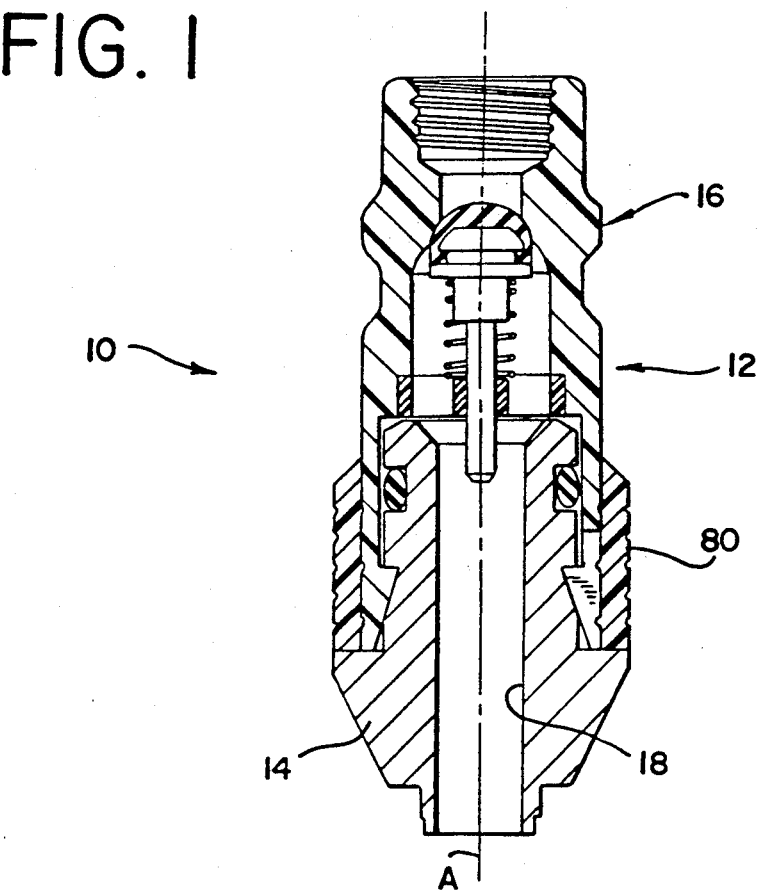
FIG. 1 is a longitudinal sectional view of a check valve which incorporates a first preferred embodiment of this invention.

Turning now to the drawings, FIG. 1 shows a sectional view of a check valve 10 which incorporates a presently preferred embodiment of this invention. The check valve 10 includes a valve body assembly 12 which is made up of a first valve body part 14 and a second valve body part 16. A central passageway 18 extends longitudinally through the valve body assembly 12 along a longitudinal axis A.

Figure 2:
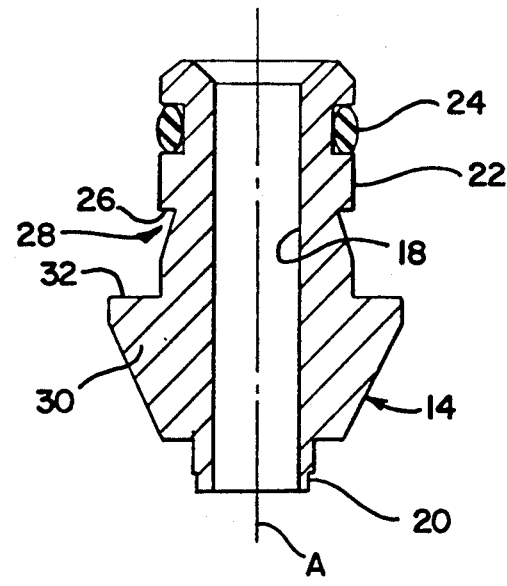
FIG. 2 is a longitudinal sectional view of the lower portion of the valve of FIG. 1.

As best shown in FIG. 2, the first valve body part 14 defines a braze port 20 at one end and a protruding neck 22 at the other end. An O-ring seal 24 is mounted in a groove formed in the outer surface of the protruding neck 22. The protruding neck 22 also defines an annular groove 26 defining a first abutment surface 28 oriented generally transversely to the axis A and facing away from the O-ring seal 24. A larger diameter portion 30 is interposed between the braze port 20 and the protruding neck 22, and the transition between the larger diameter portion 30 and the neck 22 is defined by a second abutment surface 32, which also extends generally transverse to the axis A and faces toward the O-ring seal 24.

In this embodiment the first valve body part 14 is formed of a metallic material such as aluminum, brass, or steel. The braze port 20 is shaped to fit into an opening in a metallic tube (not shown) such that the first valve body part 14 can be brazed in place in the tube.

Figure 3:
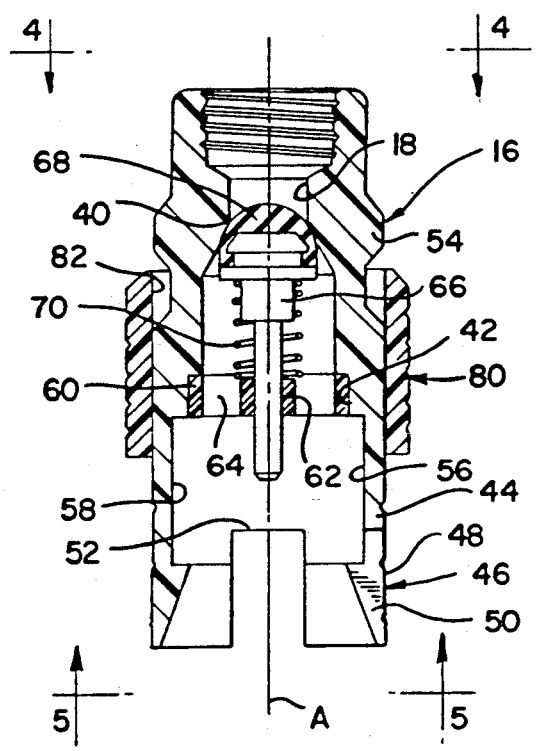
FIG. 3 is a longitudinal sectional view of the upper portion of the valve of FIG. 1.
Figure 4:
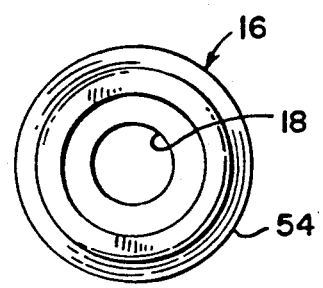
FIG. 4 is an end view taken along line 4—4 of FIG. 3.
Figure 5:
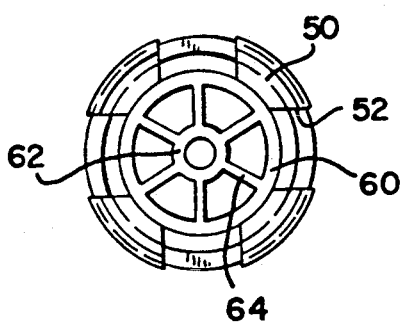
FIG. 5 is an end view taken along line 5—5 of FIG. 4.

FIGS. 3-5 provide additional views of the second valve body part 16, which defines an annular valve seat 40 extending around the central passageway 18. A portion of the central passageway 18 is enlarged in the second valve body part 16, and the second valve body part 16 defines an annular recess 42 at this enlarged portion. Additionally, the second valve body part 16 defines a circular annular flange 44 which extends generally parallel to the axis A. This flange 44 terminates in four hook elements 46, each of which comprises a respective shaft 48 and hook 50. The shafts 48 extend generally parallel to the axis A, and adjacent ones of the hook elements 46 are separated by recesses 52. The upper portion of the second valve body part 16 defines an annular circular ridge 54 shaped to engage a conventional quick disconnect coupler (not shown).

The second valve body part 16 defines an outer sidewall 56 and an inner sidewall 58. The inner sidewall 58 is shaped to receive the neck 22 in a telescoping manner. In this embodiment the outer sidewall 56 is generally frusto-conical in shape, with a larger diameter adjacent the hooks 50 and a smaller diameter adjacent the recess 42. By way of example, the angle of taper may be approximately 2°.

A retainer 60 is secured in place in the recess 42, and this retainer 60 defines a central sleeve 62 which is held in position by radial supports 64. A valve pin 66 is mounted for longitudinal movement along the axis A in the central sleeve 62. This valve pin 66 defines an elastomeric sealing head 68 which is shaped to seal against the valve seat 40. A spring 70 biases the elastomeric sealing head 68 into engagement with the valve seat 40.

Figure 6:
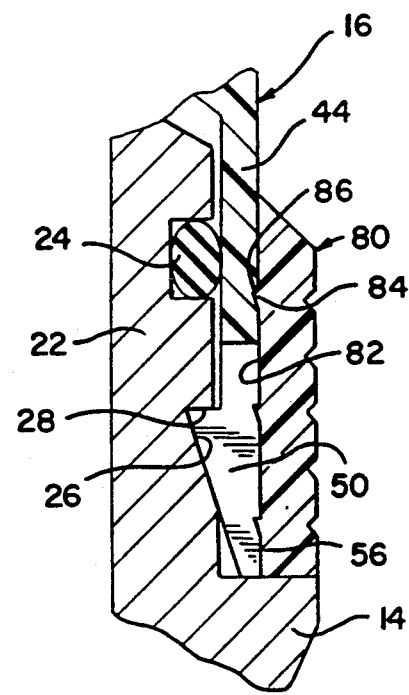
FIG. 6 is an enlarged fragmentary sectional view of a portion of the valve of FIG. 1.

A slide 80 is positioned around the second valve part 16. The slide 80 defines an inner sidewall 82 which defines a plurality of male locking teeth 84 (FIG. 6). The outer sidewall 56 of the second valve body part 16 defines a plurality of female locking teeth 86. In this embodiment the inner sidewall 82 of the slide 80 is cylindrical, and has a diameter somewhat greater than the minimum diameter of the outer sidewall 56 but somewhat less than the maximum diameter of the outer sidewall 56.

The slide 80 can be reciprocated on the second valve body part 16 between a first position as shown in FIG. 3 and a second position as shown in FIGS. 1 and 6. In the first position (FIG. 3) the slide 80 is spaced from the hooks 50, and the slide 80 does not in any way restrict radially outward movement of the hooks 50. In the second position (FIGS. 1 and 6) the slide 80 overlaps the hooks 50 and positively prevents them from moving radially outwardly, out of engagement with the groove 26.

In this preferred embodiment the second valve body part 16, the retainer 60, and the slide 80 are all formed of a polymeric material such as Nylon 6/6 or Nylon 6/12. The spring 70 is preferably formed of the stainless steel, and the pin 66 is preferably formed of brass. Further details regarding preferred materials for the spring 70 and the pin 66 may be found in U.S. Pat. No. 4,979,721, which is hereby incorporated by reference.

Simply by way of illustration, and in order to define the presently preferred embodiment of this invention, the protruding neck 22 may be provided with an outer diameter of 0.416 inches and the inner sidewall 58 may be provided with a diameter of 0.431 inches. The outer sidewall 56 may be tapered from a minimum dimension of 0.512 inches to a maximum dimension of 0.530 inches, and the slide 80 may be provided with an inner sidewall 82 diameter of 0.524 inches.

OPERATION

In operation the first valve body part 14 is first installed on a tube (not shown) by brazing the braze port 20 in place. Prior to assembly of the valve body parts 14, 16, the valve pin 66 is inserted in the retainer 60, and the retainer 60 is positively secured in place in the second valve body part 16, as for example by spin welding, ultrasonic welding, a suitable adhesive or a press fit. The sealing effectiveness of the assembled second valve body part 16 can be tested in order to insure proper operation prior to final assembly.

In order to assemble the valve body parts 12, 14, the slide 80 is positioned in the first position as shown in FIG. 3 and the second valve body part 16 is snapped in place on the first valve body part 14. The protruding neck 22 is received within the inner sidewall 58, and the O-ring seal 24 forms a seal against the inner sidewall 58. During assembly the hooks 50 initially move radially outwardly. They then snap back into position, in engagement with the groove 26. The first abutment surface 28 cooperates with the hooks 50 to lock the valve body parts 14, 16 together.

Once the valve body parts 14, 16 have been snapped together, the retainer 60 is positively captured in place, providing additional structural strength. At this point, the slide 80 is moved from the first position of FIG. 3 to the second position of FIGS. 1 and 6. As shown the male and female locking teeth 84, 86 are asymmetrical such that they resist movement of the slide 80 out of the second position of FIG. 6 with a much greater force than they resist movement of the slide 80 into the second position. Preferably, a pliers-like tool (not shown) can be used to move the slide 80 into the position of FIG. 6.

As the slide 80 is moved to the second position of FIG. 6 it accomplishes a number of functions. First, it positively captures the hooks 50 in the groove 26 to prevent disassembly of the first and second valve body parts 14, 16. Second, the slide 80 cooperates with the tapered outer sidewall 56 to compress the inner sidewall 80 against the O-ring seal 24 to improve sealing characteristics. The disclosed valve 10 has been found to seal successfully at high pressures of greater than 600 psi.

If it is necessary to replace the second valve body part 16, the slide 80 can be moved to the position of FIG. 3, and then the second valve body part 16 can be twisted off of the first valve body part 14. The slide 80 cannot be moved to the first position without damaging either the slide 80 or the second valve body part 16, and the second valve body part 16 is intended for one use only. This prevents accidental or simple manual disengagement of the valve body parts 14, 16. Because the second valve body part 16 is formed of a polymeric material while the first valve body part 16 is formed of a metallic material, it is most unlikely that the first valve body part 14 will be damaged and that replacement will be required. Previous problems associated with threaded connections between the valve body parts are completely eliminated. This reduces the prospect of damage to the first valve body part 14, and it makes the use of polymeric materials for the second valve body part 16 feasible.

Of course, it should be understood that a wide range of changes and modifications can be made to the preferred embodiment described above. For example, dimensions, proportions, configurations and materials can all be adapted as appropriate for the application of interest. As is well known, charging valves on the high and low side of an air conditioning system will differ in diameter, and it is contemplated that this invention can readily be adapted for use at either location.

It is therefore intended that the foregoing detailed description be regarded as illustrative rather than limiting, and that it be understood that it is the following claims, including all equivalents, which are intended to define the scope of this invention.

I claim:
1. A check valve comprising:
   first and second valve body parts;
   a protruding neck formed on the first valve body part; a receiving flange formed on the second body part and sized to receive the protruding neck in a telescoping
   a snap fit retaining mechanism comprising at least one hook element on one of the first and second valve body parts and at least one hook receiving element on the other of the first and second valve body parts, said hook element shaped to engage the hook receiving element to hold the first and second valve body parts together as a valve body assembly, with the neck received in the flange;

said valve body assembly defining a central passageway extending through the first and second valve body parts;

a valve seat defined around the central passageway of the valve body assembly;

a valve pin mounted in the central passageway to releasably seal against the valve seat; and a locking element mounted on the flange for selectively locking the hook element in engagement with the hook receiving element.

2. A check valve comprising:

first and second valve body parts;

a protruding neck formed on the first valve body part;

a receiving flange formed on the second body part and sized to receive the protruding neck in a telescoping manner;

a snap fit retaining mechanism comprising at least one hook element on one of the first and second valve body parts and at least one hook receiving element on the other of the first and second valve body parts, said hook element shaped to engage the hook receiving element to hold the first and second valve body parts together as a valve body assembly, with the neck received in the flange;

said valve body assembly defining a central passageway extending through the first and second valve body parts;

a valve seat defined around the central passageway of the valve body assembly;

a valve pin assembly mounted in the central passageway to releasably seal against the valve seat; and a slide mounted around the flange for reciprocating movement between a first position, in which the slide is spaced from the hook and hook receiving elements to allow the hook element to engage the hook receiving element, and a second position in which the slide locks the hook element in engagement with the hook receiving element.

3. The invention of claim 2 further comprising an O-ring seal disposed between the neck and the flange, wherein the slide is dimensioned to compress the flange against the O-ring seal when in the second position.

4. The invention of claim 2 further comprising a slide retention mechanism comprising a set of male locking teeth on one of the slide and the flange, and a set of female locking teeth on the other of the slide and the flange, said locking teeth positioned to hold the slide in the second position.

5. The invention of claim 4 wherein the locking teeth are configured such that the slide cannot be moved from the second to the first position without damage to at least one of the slide and the flange.

6. The invention of claim 2 further comprising a pin retainer captured between the first and second valve body parts around the central passageway, said pin retainer comprising a central sleeve that surrounds and guides movement of the valve pin in the central passageway.

7. The invention of claim 2 wherein the second valve body part and the slide are formed of polymeric materials, and wherein the first valve body part is formed of a metallic material and defines a braze port.

8. The invention of claim 2 wherein the at least one hook element comprises a plurality of hook elements extending away from the flange generally parallel to the central passageway, and wherein at least one hook receiving element comprises a groove extending circumferentially around the neck.

9. The invention of claim 8 wherein the groove is defined in part by an abutment surface oriented substantially transverse to the central passageway.

10. A check valve comprising:

first and second valve body parts;

a protruding neck formed on the first valve body part; a receiving flange formed on the second body part and sized to receive the protruding neck in a telescoping manner;

a snap fit retaining mechanism comprising at least one hook element on one of the first and second valve body parts and at least one hook receiving element on the other of the first and second valve body parts, said hook element shaped to engage the hook receiving element to hold the first and second valve body parts together as a valve body assembly, with the neck received in the flange;

said valve body assembly defining a central passageway extending through the first and second valve body parts;

a valve seat defined around the central passageway of the valve body assembly;

a valve pin mounted in the central passageway to releasably seal against the valve seat;

wherein the second valve body part is formed of a polymeric material, and wherein the first valve body part is formed of a metallic material and defines a braze port.

11. The invention of claim 10 wherein the at least one hook element comprises a plurality of hook elements extending away from the flange generally parallel to the central passageway, and wherein the at least one hook receiving element comprises a groove extending circumferentially around the neck.

12. The invention of claim 11 wherein the groove is defined in part by an abutment surface oriented substantially transverse to the central passageway.

13. A check valve comprising:

a first valve body part defining a protruding neck having a first passageway extending therethrough;

a second valve body part having a receiving flange sized to receive the protruding neck in a telescoping manner and having a second passageway extending therethrough;

a snap fit retaining mechanism comprising a plurality of hooks extending from the flange and a hook receiving groove extending circumferentially around the neck, said hooks shaped to engage the hook receiving groove to hold the first and second valve body parts together as a valve body assembly, with the neck received in the flange and the first and second passageways held in alignment;

a valve seat defined around the second passageway of the second valve body part;

a valve pin configured to releasably seal against the valve seat;

a pin retainer captured between the first and second valve body parts around the second passageway, said pin retainer comprising a central sleeve that surrounds and guides movement of the valve pin in the second passageway;

a slide mounted around the flange for reciprocating movement between a first position, in which the slide is spaced from the hooks and hook receiving groove to allow the hooks to engage the hook receiving groove, and a second position, in which the slide locks the hooks in engagement with the hook receiving groove;

a slide retention mechanism comprising a plurality of male locking teeth on one of the slide and the flange, and a plurality of female locking teeth on the other of the slide and the flange, said locking teeth positioned to hold the slide in the second position.

14. The invention of claim 13 further comprising an O-ring seal disposed circumferentially around the neck between the neck and the flange, wherein the slide is dimensioned to compress the flange against the O-ring seal when in the second position.

15. The invention of claim 13 wherein the locking teeth are configured such that the slide cannot be moved from the second to the first position without damage to at least one of the slide and the flange.

16. The invention of claim 13 wherein the second valve body part and the slide are formed of polymeric materials, and wherein the first valve body part is formed of a metallic material and defines a braze port.

17. The invention of claim 13 wherein the groove is defined in part by an abutment surface oriented substantially transverse to the first passageway.

18. A check valve subassembly comprising:

a valve body part defining an axially oriented central passageway extending therethrough;

a valve seat defined around the central passageway of the valve body part;

a valve pin mounted in the central passageway to releasably seal against the valve seat;

a circumferential flange formed on the valve body part and sized to receive a mating protruding neck in a telescoping manner;

a plurality of hook elements on the valve body part, said hook elements each comprising a resilient shaft mounted to the flange and a hook mounted to the shaft and oriented toward the passageway;

a slide mounted around the flange for reciprocating movement between a first position, in which the slide is spaced from the hooks to allow the hooks to move away from the central passageway, and a second position, in which the slide blocks the hooks from moving away from the central passageway.

19. The invention of claim 18 further comprising a plurality of slide retention teeth positioned on an inside surface of the slide to hold the slide in the second position.

20. The invention of claim 18 further comprising a pin retainer secured to the valve body part around the central passageway, said pin retainer comprising a central sleeve that surrounds and guides movement of the valve pin in the central passageway.

21. The invention of claim 18 wherein the valve body part and the slide are formed of polymeric materials.

22. The invention of claim 18 wherein the hooks extend away from the flange generally parallel to the central passageway.

* * * * *

UNITED STATES PATENT AND TRADEMARK OFFICE
CERTIFICATE OF CORRECTION

PATENT NO. : 5,113,900
DATED : May 19, 1992
INVENTOR(S) : Major H. Gilbert

It is certified that error appears in the above-identified patent and that said Letters Patent is hereby corrected as shown below:

In column 1, line 30, after "gall" please delete "." and substitute therefor --,--.

Column 4:

In Claim 1, line 6, after "telescoping", please insert --manner;--.

In Claim 2, line 21, please delete "assembly".

In Claim 8, line 4, after "passageway", please delete "." and substitute therefor --,--.

In Claim 18, line 11, after "part", please delete "." and substitute therefor --,--.

Signed and Sealed this

Ninth Day of May, 1995

Attest:

BRUCE LEHMAN

Attesting Officer

Commissioner of Patents and Trademarks